(12) United States Patent
Takubo et al.

(10) Patent No.: US 8,778,547 B2
(45) Date of Patent: Jul. 15, 2014

(54) POWER GENERATING SYSTEM

(75) Inventors: Hidetoshi Takubo, Osaka (JP);
Motomichi Katou, Nara (JP)

(73) Assignee: Panasonic Corporation, Osaka (JP)

( * ) Notice: Subject to any disclaimer, the term of this patent is extended or adjusted under 35 U.S.C. 154(b) by 587 days.

(21) Appl. No.: 12/664,996

(22) PCT Filed: Jul. 3, 2008

(86) PCT No.: PCT/JP2008/001748
§ 371 (c)(1),
(2), (4) Date: Dec. 16, 2009

(87) PCT Pub. No.: WO2009/004809
PCT Pub. Date: Jan. 8, 2009

(65) Prior Publication Data
US 2010/0178575 A1    Jul. 15, 2010

(30) Foreign Application Priority Data
Jul. 4, 2007   (JP) ................................ 2007-175886

(51) Int. Cl.
*H01M 8/18* (2006.01)

(52) U.S. Cl.
USPC ........................................ 429/423; 429/512

(58) Field of Classification Search
USPC ............................................... 429/423, 512
See application file for complete search history.

(56) References Cited

U.S. PATENT DOCUMENTS

2002/0122965 A1 *  9/2002  Yu ................................... 429/17
2002/0127446 A1    9/2002  Ueda et al.
2007/0264548 A1 * 11/2007  Yagi et al. ....................... 429/24
2008/0107926 A1 *  5/2008  Yamada et al. .................. 429/12
2008/0118798 A1 *  5/2008  Gallagher ........................ 429/23
2009/0291337 A1 * 11/2009  Tamura et al. .................. 429/17

FOREIGN PATENT DOCUMENTS

| JP | 01-320775   | 12/1989 |
| JP | 05-290868   | 11/1993 |
| JP | 07-014589   | 1/1995  |
| JP | 2002-329515 | 11/2002 |
| JP | 2003-151587 | 5/2003  |
| JP | 2006-019035 | 1/2006  |
| JP | 2006-156116 | 6/2006  |
| JP | 2007-200650 | 8/2007  |

* cited by examiner

*Primary Examiner* — Mark F Huff
*Assistant Examiner* — Monique Wills
(74) *Attorney, Agent, or Firm* — McDermott Will & Emery LLP

(57) ABSTRACT

A power generating system of the present invention includes: a package (70); a power generator (1); a combustible gas passage (23); a first device configured to operate by a first voltage using a DC power generated by the power generator (1); a second power supply circuit (13) configured to generate the DC power of the first voltage; a first connecting unit (8) arranged between the first device and the second power supply circuit (13); a control circuit (7) configured to control the first device using the DC power of the first voltage; and a first power supply circuit (11) configured to generate a power of a second voltage higher than the first voltage, and the package (70) is divided by a dividing wall (71) into a first space (72) in which the power generator (1), the combustible gas passage (23), the first device, the first connecting unit (8), and the control circuit (7) are arranged and a second space (73) in which the first power supply circuit (11) and the second power supply circuit (13) are arranged.

13 Claims, 1 Drawing Sheet

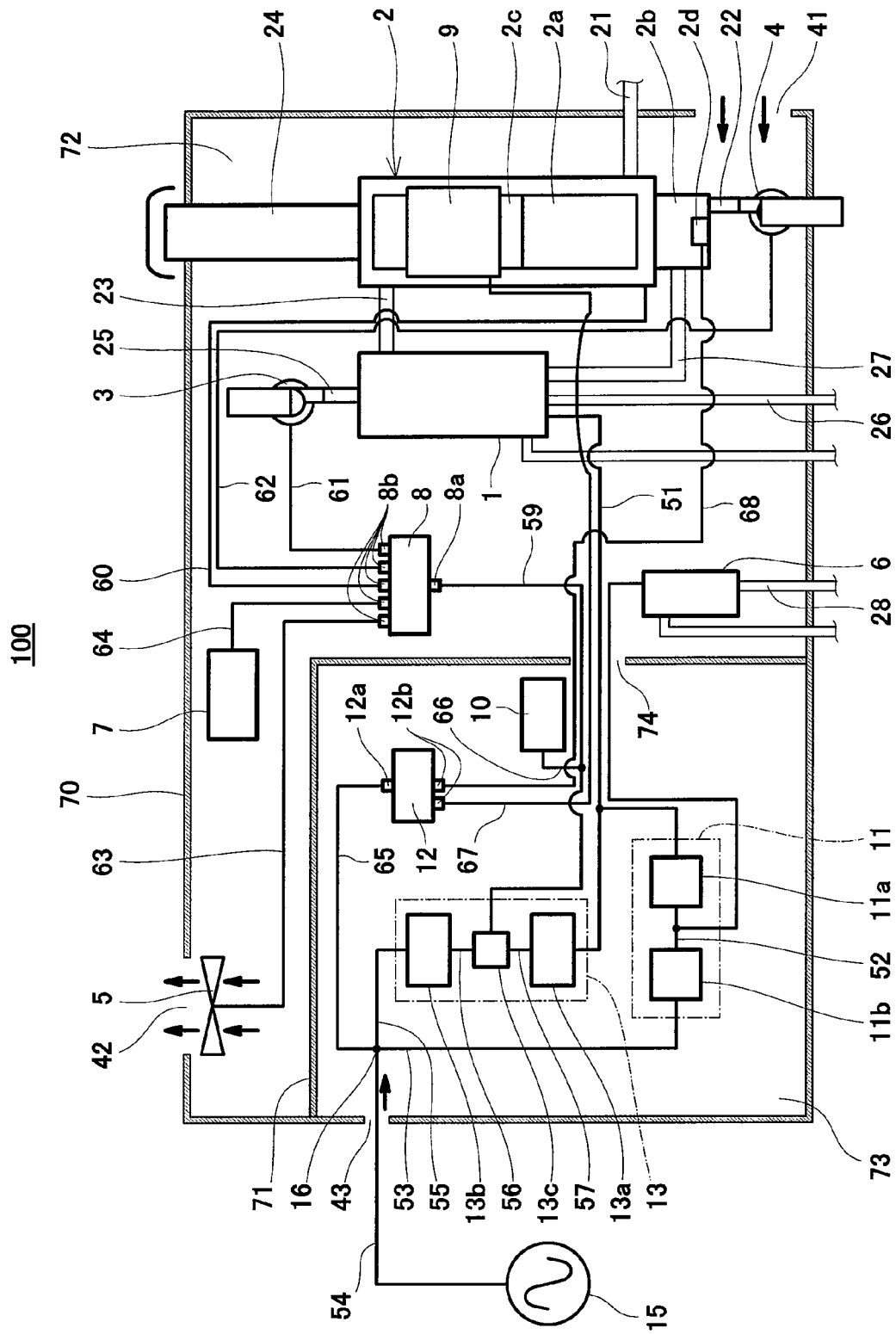

POWER GENERATING SYSTEM

RELATED APPLICATIONS

This application is the U.S. National Phase under 35 U.S.C. §371 of International Application No. PCT/JP2008/001748, filed on Jul. 3, 2008, which in turn claims the benefit of Japanese Application No. 2007-175886, filed on Jul. 4, 2007, the disclosures of which Applications are incorporated by reference herein.

TECHNICAL FIELD

The present invention relates to a power generating system, and particularly to the configuration of a power generating system in which a fuel cell is arranged in a package.

BACKGROUND ART

A fuel cell system is a system configured to generate electricity and heat at the same time by causing a hydrogen-containing fuel gas obtained by reforming a material gas, such as a city gas, and an oxygen-containing oxidizing gas, such as air, to electrochemically react with each other and to supply the generated electricity to an external electric power load (such as a domestic electrical apparatus).

Known is a fuel cell system configured such that the entire fuel cell system is arranged in a package to facilitate delivery, installation, and the like in a case where the fuel cell system is used as a mobile power supply or a distributed (on-site) power supply (see Patent Document 1 for example).

In accordance with the fuel cell system disclosed in Patent Document 1, the inside of the package is divided by a dividing wall into a gas passage chamber and a non-gas chamber. In the gas passage chamber, a reformer, a fuel cell, a ventilation fan, and the like are arranged. In the non-gas chamber, a control device, an air blower, a water supplier, and the like are arranged. With this, even if a combustible gas leaks from the reformer or the fuel cell in the gas passage chamber, it is discharged by the ventilation fan to the outside of the package (gas passage chamber). Therefore, the leaked combustible gas does not flow into the reformer and the like to cause explosion and the like. In addition, since the control device is separated from the gas passage chamber by the dividing wall, ignition or explosion caused by spark and the like generated by the control device is unlikely to occur.

Patent Document 1: Japanese Laid-Open Patent Application Publication No. 2002-329515

DISCLOSURE OF THE INVENTION

Problems to be Solved by the Invention

However, in the fuel cell system disclosed in Patent Document 1, since the entire control device is arranged in the non-gas chamber that is not a passage through which the combustible gas flows, wires to the devices in the gas chamber are likely to become long and complex. If the control device is arranged in the gas passage chamber to avoid the complexity of the wires, and the combustible gas leaks from the reformer or the fuel cell arranged in the gas passage chamber, especially, a power supply circuit configured to generate high-voltage (100 V or more) DC power or AC power is likely to generate spark, and the combustible gas may be ignited.

The present invention was made to solve the above problems, and an object of the present invention is to provide a power generating system capable of reducing the complexity of the wires connecting respective devices while suppressing the possibility of the occurrence of the ignition or the like of the control device even if the combustible gas leaks in the package.

Means for Solving the Problems

In order to solve the above problems, a power generating system according to the present invention includes: a package; a power generator configured to generate a DC power using a combustible gas; a combustible gas passage through which the combustible gas flows; a first device configured to operate using a DC power of a first voltage; a second power supply circuit configured to generate the DC power of the first voltage from an AC power supplied from a system power supply; a first connecting unit disposed between the first device and the second power supply circuit to electrically connect the first device and the second power supply circuit; a control circuit configured to control the first device using the DC power of the first voltage; and a first power supply circuit configured to generate a power of a second voltage higher than the first voltage, wherein the package is divided by a dividing wall into a first space in which the power generator, the combustible gas passage, the first device, the first connecting unit, and the control circuit are arranged and a second space in which the first power supply circuit and the second power supply circuit are arranged.

As above, the first power supply circuit and the second power supply circuit each of which receives and outputs the power of the high voltage (second voltage) and tends to generate spark are arranged in the second space. With this, even if the combustible gas leaks in the first space, the ignition caused by the spark generated by the first and second power supply circuits can be suppressed. Moreover, since the first connecting unit connected to the first device configured to operate by the voltage (first voltage) lower than the second voltage and the control circuit configured to control the operation of the first device using the DC power of the first voltage are unlikely to generate the spark, the first connecting unit and the control circuit are arranged in the first space. Therefore, the complexity of the wires electrically connecting the second power supply circuit and the first connecting unit can be reduced while suppressing the ignition risk of the combustible gas by the spark.

Moreover, the power generating system according to the present invention may further include: a second device arranged in the package to operate by the power of the second voltage; and a second connecting unit arranged between the system power supply and the second device or between the first power supply circuit and the second device to electrically connect the system power supply and the second device or the first power supply circuit and the second device, wherein the second connecting unit may be arranged in the second space.

With this, the second connecting unit which is connected to the second device configured to operate using the power of the second voltage and tends to generate the spark is arranged in the second space. Therefore, the ignition of the combustible gas by the spark can be further suppressed.

Moreover, the power generating system according to the present invention may further include: a communicating portion formed at a part of the dividing wall and through which the first space and the second space are communicated with each other; and a ventilator configured to discharge the gas in the first space to outside.

This forms such a gas flow that the gas in the first space flows into the second space through the communicating portion by the operation of the ventilator and is finally discharged to the outside of the system by the ventilator. Therefore, even if the combustible gas leaks in the first space, the ignition of the combustible gas by the spark of the first power supply circuit in the second space into which the combustible gas has flowed can be adequately suppressed.

Moreover, the power generating system according to the present invention may further include a hydrogen generator including a reformer configured to generate a hydrogen-containing gas using a material gas by a reforming reaction, wherein the power generator may be a fuel cell configured to generate electric power using the hydrogen-containing gas supplied from the hydrogen generator, and the hydrogen generator may be arranged in the first space.

Moreover, the power generating system according to the present invention may further include a first oxidizing gas supplier configured to supply an oxidizing gas to the fuel cell, wherein the first device may be the first oxidizing gas supplier.

Moreover, the power generating system according to the present invention may further include: a combustor configured to heat the reformer; and a second oxidizing gas supplier configured to supply an oxidizing gas to the combustor, wherein the first device may be the second oxidizing gas supplier.

Moreover, in the power generating system according to the present invention, the hydrogen generator may include a shift converter configured to reduce carbon monoxide in the hydrogen-containing gas supplied from the reformer by a shift reaction, and the second device may be a heater configured to heat the shift converter.

Moreover, in the power generating system according to the present invention, the combustor may include an igniter, and the second device may be the igniter.

Moreover, in the power generating system according to the present invention, the second connecting unit may be configured to have a function of supplying and stopping supplying the electric power to the second device.

Moreover, in the power generating system according to the present invention, supply of a voltage from the second connecting unit to the second device may stop in a stand-by state.

Moreover, in the power generating system according to the present invention, supply of a voltage from the second device to the second device may stop in a case where a malfunction regarding leakage of the combustible gas occurs.

The above object, other objects, features and advantages of the present invention will be made clear by the following detailed explanation of preferred embodiment with reference to the attached drawing.

Effects of the Invention

In accordance with the power generating system of the present invention, the complexity of the wires connecting respective devices can be reduced while suppressing the possibility of the occurrence of the ignition or the like caused by the spark generated by the control device even if the combustible gas leaks in the package.

BRIEF DESCRIPTION OF THE DRAWINGS

FIG. 1 is a schematic diagram showing a schematic configuration of a power generating system according to Embodiment 1 of the present invention.

EXPLANATION OF REFERENCE NUMBERS 1 fuel cell (power generator)
2 hydrogen generator
2a reformer
2b burner (combustor)
2c shift converter
2d igniter
3 air blower (first oxidizing gas supplier)
4 combustion fan (second oxidizing gas supplier)
5 exhaust fan (ventilator)
6 surplus heater
7 first control circuit
8 first connector (first connecting unit)
8a input terminal
8b output terminal
9 shift converter heater
10 second control circuit
11 inverter circuit (first power supply circuit)
11a DC/DC converter
11b DC/AC inverter
12 second connector (second connecting unit)
12a input terminal
12b output terminal
13 power supply circuit (second power supply circuit)
13a AC/DC converter
13b DC/DC converter
13c switch
15 system power supply
21 material gas passage
22 second oxidizing gas passage
23 fuel gas passage (combustible gas passage)
24 reformer exhaust pipe
25 first oxidizing gas passage
26 primary heat medium passage
27 secondary heat medium circulating passage
41 intake port
42 exhaust port
43 intake port
51 electric wire
52 electric wire
53 electric wire
54 electric wire
55 electric wire
56 electric wire
57 electric wire
58 electric wire
59 electric wire
60 electric wire
61 electric wire
62 electric wire
63 electric wire
64 electric wire
65 electric wire
66 electric wire
67 electric wire
68 electric wire
70 package
71 dividing wall
72 first space
73 second space
74 communicating portion (through hole)
100 power generating system

BEST MODE FOR CARRYING OUT THE INVENTION

Hereinafter, a preferred embodiment of the present invention will be explained in reference to the drawing.

Embodiment 1

FIG. 1 is a schematic diagram showing a schematic configuration of a power generating system according to Embodiment 1 of the present invention.

As shown in FIG. 1, a power generating system 100 according to Embodiment 1 includes a package 70 constituted by a housing. An internal space of the package 70 is divided into a first space 72 and a second space 73 by a dividing wall 71. A through hole 74 is formed at an appropriate portion of the dividing wall 71 so as to penetrate the dividing wall 71 in a thickness direction thereof. The through hole 74 forms a communicating portion 74 through which the first space 72 and the second space 73 are communicated with each other. Wires electrically connecting between devices in the first space 72 and devices in the second space are arranged to fill in an internal space of the communicating portion 74. With this, a gas hardly flows between the first space 72 and the second space 73 through the communicating portion 74. The respective wires will be described later.

Arranged in the first space 72 are a fuel cell (power generator) 1 configured to generate DC power, a hydrogen generator 2, a first device configured to operate by a low voltage (first voltage) using the DC power generated by the fuel cell or the DC power obtained by converting AC power supplied from a system power supply, a surplus heater 6 configured to consume surplus electric power generated by the fuel cell, a first connector (first connecting unit) 8, and a shift converter heater 9 configured to operate by a high voltage (second voltage). Meanwhile, arranged in the second space 73 are a power supply circuit 13 that is a second power supply circuit of the present invention, a second control circuit 10, an inverter circuit 11 that is a first power supply circuit of the present invention, and a second connector (second connecting unit) 12.

Here, the first device is a device configured to operate using the DC power generated by the fuel cell 1 or the DC power obtained by converting the AC power supplied from the system power supply and to operate by the low voltage (24 V for example). In the present embodiment, an air blower (first oxidizing gas supplier) 3, a combustion fan (second oxidizing gas supplier) 4, and an exhaust fan (ventilator) 5 are the first devices. Moreover, the second device is a device configured to operate by the high voltage (100 V or 200 V for example). In the present embodiment, an igniter 2d, the surplus heater 6, and the shift converter heater 9 are the second devices.

First, the devices arranged in the first space 72 will be explained.

The hydrogen generator 2 including a reformer 2a, a burner (combustor) 2b, and a shift converter 2c is arranged in the first space 72. The hydrogen generator 2 has a material gas introducing port through which a material gas is supplied. A downstream end of a material gas passage 21 is connected to the material gas introducing port. Moreover, an upstream end of the material gas passage 21 is connected to a material supplier (not shown) arranged outside the power generating system 100. The material gas is a gas containing an organic compound formed by at least carbon and hydrogen, and examples are a gas, such as methane, ethane, and propane, containing hydrocarbon, and a gas containing gaseous alcohol.

The burner 2b of the hydrogen generator 2 includes the igniter 2d and is connected to the combustion fan 4 via a second oxidizing gas passage 22. The combustion fan 4 is configured to have an inlet port open to the outside of the package 70 and supply a second oxidizing gas (air) to the burner 2b. Moreover, the burner 2b is connected to an upstream end of a reformer exhaust pipe 24 through which a combustion gas flows, and a downstream end of the reformer exhaust pipe 24 is open to the outside of the package 70. Further, the burner 2b is connected to the fuel cell 1 via an off gas passage 27, and a surplus fuel gas unconsumed in the fuel cell 1 is supplied to the burner 2b as an off gas.

With this, the burner 2b of the hydrogen generator 2 ignites and combusts the material gas supplied through a passage, not shown, (or the off gas supplied from the fuel cell 1 through the off gas passage 27) and the second oxidizing gas to generate the combustion gas. The generated combustion gas is discharged through the reformer exhaust pipe 24 to the outside of the package 70. Then, the reformer 2a carries out a reforming reaction between the material gas and steam supplied through a passage, not shown, by utilizing heat transferred from the combustion gas generated in the burner 2b, thereby generating a hydrogen-containing gas. As the combustion fan 4, fans, such as a sirocco fan, configured to operate by known DC and low voltage may be used, or a blower may be used.

Moreover, the shift converter 2c and a purifier (not shown) in the hydrogen generator 2 causes the hydrogen-containing gas generated in the reformer 2a to be subjected to a shift reaction and a selective reaction to generate the hydrogen-containing gas (combustible gas; hereinafter referred to as "fuel gas") whose carbon monoxide concentration is reduced to about 1 ppm. At this time, the shift converter 2c and the purifier need to be maintained at a predetermined temperature. For example, immediately after the start of the operation of the power generating system 100, the shift converter heater 9 arranged around the shift converter 2c heats the shift converter 2c to maintain the shift converter 2c at the predetermined temperature. Then, the generated fuel gas flows out from a fuel gas outlet port of the hydrogen generator 2 to the fuel cell 1. Herein, used as the shift converter heater 9 is a known sheath heater configured to operate by AC and high voltage.

The fuel cell 1 has a fuel gas supply port, and the fuel gas supply port is connected to the fuel gas outlet port of the hydrogen generator 2 via a fuel gas passage (combustible gas passage) 23. Moreover, the fuel cell 1 has a first oxidizing gas supply port, and the first oxidizing gas supply port is connected to the air blower 3 via a first oxidizing gas passage 25. The air blower 3 is configured to include an inlet port open to the first space 72 and supply a first oxidizing gas (air) to a cathode of the fuel cell 1. Used as the air blower 3 is a blower configured to operate by known DC and low voltage, but fans, such as a sirocco fan, may be used.

Moreover, the fuel cell 1 is provided with a primary heat medium passage 26 used to recover exhaust heat generated in the fuel cell 1. A portion of the primary heat medium passage 26 is connected to a primary passage of a heat exchanger (not shown). Moreover, a secondary passage of the heat exchanger is connected to a secondary heat medium circulating passage 28. A hot water tank (not shown) and the surplus heater 6 are disposed on a portion of the secondary heat medium circulating passage 28. With this, a primary heat medium flowing through the primary heat medium passage 26 recovers the exhaust heat generated in the fuel cell 1 to carry out heat exchange with a secondary heat medium in the heat exchanger. Thus, the inside of the fuel cell 1 can be maintained at an appropriate temperature. Herein, water is used as each of the primary heat medium and the secondary heat medium.

The surplus heater 6 is configured to consume surplus electric power of the electric power generated by the fuel cell 1 and heats the heat medium flowing through the secondary heat medium circulating passage 27. Herein, used as the surplus heater 6 is an electric heater, such as a sheath heater, configured to operate by known DC and high voltage, but an electric heater configured to operate by AC and high voltage may be used.

Moreover, an intake port 41 and an exhaust port 42 are formed at appropriate portions of the package 70 constituting the first space 72. It is preferable that the intake port 41 and the exhaust port 42 be separated from each other as far as possible such that outside air flows through the entire first space 72. The exhaust fan 5 is arranged in the vicinity of the exhaust port 42. Used as the exhaust fan 5 is a fan or the like, such as a sirocco fan, configured to operate by known DC and low voltage. With this, the outside air is suctioned through the intake port 41 by the exhaust fan 5, and the suctioned outside air is discharged through the exhaust port 42 (shown by arrows in FIG. 1).

Moreover, the first connector 8 is arranged in the first space 72. The first connector 8 also serves as a power distribution unit. The power supply circuit 13 is connected to an input side of the first connector 8 by an electric wire 59, and all the first devices are respectively connected to output sides of the first connector 8 by electric wires 60 to 64. Then, the first connector 8 distributes to the first devices the DC low-voltage power output from the power supply circuit 13 that is the second power supply circuit of the present invention. Details of electrical connections between the first connector 8 and the power supply circuit, and the like will be described later.

Further, a first control circuit 7 is arranged in the first space 72. Then, the first control circuit 7 is configured to control via the first connector 8 voltages supplied to the first devices. The first control circuit 7 is constituted by a control substrate configured to operate by DC and low voltage. The first control circuit 7 controls the amount of operation of each first device and the output of each first device via signal wires, not shown, connected to the first devices. The first control circuit 7 and the first connector 8 are separately formed in FIG. 1, but may be integrally formed on the same substrate.

As above, the first control circuit 7 whose operating voltage is low among control devices and which is unlikely to generate spark is arranged in the first space 72. With this, even if the combustible gas leaks in the first space 72, the possibility of the occurrence of the ignition of the combustible gas is suppressed. In addition, the first connector 8 having a power distribution function is arranged in the first space 72 and is connected via wires to the first devices configured to operate by low-voltage current. With this, the configuration of the power generating system 100 can be simplified while suppressing the ignition risk of the combustible gas by the generation of the spark in the first connector 8, and the complexity of the wires connecting the power supply circuit 13 and the first devices can be reduced.

Next, the devices arranged in the second space 73 will be explained.

The inverter circuit 11 that is the first power supply circuit of the present invention is arranged in the second space 73. The inverter circuit 11 includes a DC/DC converter 11a and a DC/AC inverter 11b. The DC/DC converter 11a converts the DC power generated by the fuel cell 1 into high-voltage (herein, 200V) DC voltage. The DC/AC inverter 11b converts the DC power output from the DC/DC converter 11a into the AC power.

The power supply circuit 13 that is the second power supply circuit of the present invention is arranged in the second space 73. The power supply circuit 13 includes a DC/DC converter 13a, an AC/DC converter 13b, and a switch 13c. The DC/DC converter 13a converts the DC power generated by the fuel cell 1 into a predetermined low-voltage (herein, 24 V) DC voltage. The AC/DC converter 13b converts the AC power supplied from a system power supply 15 into a low-voltage DC power. The switch 13c outputs the DC power supplied from the DC/DC converter 13a and the AC/DC converter 13b while switching therebetween. An output side of the switch 13c is connected to the input side of the first connector 8 via the electric wire 59.

Moreover, an intake port 43 and the communicating portion 74 are formed at appropriate portions of the package 70 constituting the second space 73. It is preferable that the intake port 43 and the communicating portion 74 be separated from each other as far as possible such that outside air flows through the entire second space 73. The first space 72 tends to be lower in pressure than the second space 73 by the operation of the exhaust fan 5 and the operation of the air blower 3 open in the first space 72. Therefore, even if the combustible gas leaks from the fuel cell 1 or the hydrogen generator 2 arranged in the first space 72, the possibility of the occurrence of the leakage of the combustible gas through the communicating portion 74 to the second space 73 is low.

Moreover, the second connector 12 is arranged in the second space 73. The second connector 12 also serves as a power distribution unit. An input side of the second connector 12 is connected to the system power supply 15 (to be precise, a system interconnection point 16) and an output side of the inverter circuit 11 (to be precise, the DC/AC inverter 11b) via an electric wire 65. Output terminals 12b of the second connector 12 are respectively connected to the shift converter heater 9 that is the second device via an electric wire 67 and the igniter 2d via an electric wire 68. Moreover, the second connector 12 (to be precise, an input terminal 12a thereof) is configured to be supplied with AC high-voltage power from the system power supply 15 at all times and supply and stop supplying the electric power to the second devices. More specifically, the second connector 12 includes a switch configured to turn on and off the application of the voltage to the second devices. Then, the second connector 12 distributes to the second devices the AC high-voltage power output from the system power supply 15.

Further, the second control circuit 10 is arranged in the second space 73. The second control circuit 10 is connected to the output side of the switch 13c of the power supply circuit 13 via an electric wire 66. In addition, the second control circuit 10 is connected to the second connector 12 via a wire (not shown) through which a control signal is transferred from the second control circuit 10. Then, the control circuit 10 is configured to control via the second connector 12 the voltages supplied to the second device (shift converter heater 9). Moreover, the second control circuit 10 controls the amount of operation of each second device and the output of each second device via signal wires, not shown, connected to the second devices. Further, the second control circuit 10 also controls on and off of the switch of the second connector 12. Specifically, in a period from when the power generating system of the present embodiment terminates a stop operation until when it starts a next start-up operation (i.e., at the time of stand-by in the present invention), the second control circuit 10 turns off the switch to reduce the power consumption at the time of the stand-by. The second control circuit 10 and the second connector 12 are separately formed in FIG. 1, but may be integrally formed on the same substrate.

As above, the inverter circuit 11 that is the first power supply circuit and the power supply circuit 13 that is the second power supply circuit each of which receives and outputs high-voltage (second voltage) power among the control devices and tends to generate the spark are arranged in the second space 73 separated from the first space 72 by the dividing wall 71. With this, even if the combustible gas leaks in the first space 72, the possibility of the occurrence of the ignition of the combustible gas is suppressed. Moreover, the second connector 12 connected via the wire to the second device configured to operate by high-voltage current is arranged in the second space 73. With this, the ignition risk of the combustible gas by the generation of the spark in the second connector 12 is suppressed. As above, the igniter 2d, the surplus heater 6, and the shift converter heater 9 that are the second devices are arranged in the first space 72. If the combustible gas leaks in the package 70, the control devices, such as the first control circuit 7 and the second control circuit 10, stop the operation of the power generating system 100 and do not allow the operation of the power generating system 100. Therefore, the possibility of the occurrence of the ignition of the combustible gas is suppressed. Especially, the second devices, such as the igniter 2d and the shift converter heater 9, are supplied with high voltage even when they are not operating. Therefore, this becomes the ignition risk in a case where the combustible gas leaks in the package 70. Here, in accordance with the power generating system of the present embodiment, the second control circuit 10 turns off the switch of the second connector 12 to stop applying the voltage to the igniter 2d and the shift converter heater 9. Therefore, the possibility of the occurrence of the ignition of the combustible gas is further suppressed.

Next, the wires of the power generating system 100 according to Embodiment 1 will be explained.

One end of an electric wire 51 is connected to an output terminal of the fuel cell 1, and the other end thereof is connected to both an input terminal of the DC/DC converter 11a of the inverter circuit 11 and an input terminal of the DC/DC converter 13a of the power supply circuit 13 in parallel. An output terminal of the DC/DC converter 11a is connected to both an input terminal of the surplus heater 6 and an input terminal of the DC/AC inverter 11b via an electric wire 52 in parallel. With this, the surplus electric power generated by the fuel cell 1 can be efficiently consumed by the surplus heater 6.

One end of an electric wire 53 is connected to an output terminal of the DC/AC inverter 11b, and the system interconnection point 16 is provided at the other end of the electric wire 53. The system power supply 15 is connected to the system interconnection point 16 by an electric wire 54, and an input terminal of the AC/DC inverter 13b of the power supply circuit 13 is also connected to the system interconnection point 16 by an electric wire 55. The inverter circuit 11 and the system power supply 15 are interconnected at the system interconnection point 16.

One end of an electric wire 56 is connected to an output terminal of the AC/DC inverter 13b, and the other end thereof is connected to one of input terminals of the switch 13c. Moreover, an output terminal of the DC/DC converter 13a is connected to the other input terminal of the switch 13c via an electric wire 57.

An output terminal of the switch 13c is connected to an input terminal 8a of the first connector 8 in the first space via the electric wire 59. Then, five output terminals 8b of the first connector 8 are respectively connected to input terminals of the first devices (the hydrogen generator 2, the air blower 3, the combustion fan 4, the exhaust fan 5, and the first control circuit 7) via the electric wires 60 to 64. The output terminal of the switch 13c is connected to the second control circuit 10 via an electric wire 66.

In a period from when the power generating system 100 starts up and until when the fuel cell 1 generates the electric power, the AC/DC inverter 13b of the power supply circuit 13 converts the AC supplied from the system power supply 15 into the low-voltage (24 V for example) DC power, and the first control circuit 7, the second control circuit 10, and the first devices, such as the combustion fan 4, operate using the converted DC power by the switch 13c. Moreover, the shift converter heater 9 operates using the AC supplied from the system power supply 15. Then, when the fuel cell 1 starts generating the electric power, the DC power is supplied from the DC/DC converter 13a to the first devices by the control of the first control circuit 7, and the AC is supplied from the AC/DC inverter 13b to the second devices by the control of the second control circuit 10. The switch 13c and the surplus heater 6 are controlled by a third control circuit, not shown.

As above, in the present embodiment, an output terminal of the power supply circuit 13 is connected to the input terminals of the first devices using as a relay point the first connector 8 arranged in the first space 72 in which the first devices are arranged. Therefore, the complexity of the electric wires can be reduced as compared to a case where an exit of the power supply circuit 13 in the second space 73 and the first devices in the first space 72 are directly connected to each other or a case where the first connector in the second space 73 and the first devices in the first space 72 are connected to each other. Moreover, the power supply circuit 13 and the first connector 8 can be connected to each other by the single electric wire 59. Therefore, the through hole 74 of the dividing wall 71 can be reduced in size as compared to a case where the exit of the power supply circuit 13 in the second space 73 and the first devices in the first space 72 are directly connected to each other or a case where the first connector 8 in the second space 73 and the first devices in the first space 72 are connected to each other. Therefore, even if the combustible gas leaks in the first space 72, the leakage of the combustible gas to the second space 73 can be reduced.

Moreover, the system power supply 15 is connected to the input terminal 12a of the second connector 12 via the electric wire 54. The output terminal 12b of the second connector 12 is connected to an input terminal of the shift converter heater 9 via an electric wire 67. Moreover, the output terminal 12b of the second connector 12 is connected to an input terminal of the igniter 2d via the electric wire 68. With this, the high-voltage AC power is supplied from the system power supply 15 through the second connector 12 to the igniter 2d and the shift converter heater 9.

As above, in the present embodiment, the second connector 12 which may generate spark by the high-voltage AC is arranged in the second space 73. Therefore, even if the combustible gas leaks in the first space 72, the possibility of the occurrence of the ignition or the like of the combustible gas by the spark generated by the second connector 12 is suppressed.

Next, the operation of the power generating system 100 according to Embodiment 1 will be explained. The following operations are controlled by the first control circuit 7 and the second control circuit 10.

First, a part of the material gas is supplied as a combustion fuel at a predetermined supply rate from the material gas supplier, not shown, through the material gas passage 21 to the burner 2b of the hydrogen generator 2, and the second oxidizing gas is supplied at a predetermined supply rate from the combustion fan 4 through the second oxidizing gas passage 22 to the burner 2b. Then, the burner 2b ignites and burns the supplied material gas and second oxidizing gas by the igniter 2d to generate the combustion gas. The generated combustion gas flows through the reformer exhaust pipe 24 and is discharged from the downstream end of the reformer exhaust pipe 24 to the outside of the package 70. At this time, the reformer 2a, the shift converter 2c, and the purifier, not shown, are heated by the heat transferred from the combustion gas. At the time of the start of the operation of the power generating system 100, the shift converter heater 9 operates to rapidly heat the shift converter 2c.

Meanwhile, a part of the material gas is supplied from the material gas supplier, not shown, through the material gas passage 21 to the reformer 2a of the hydrogen generator 2, and water is separately supplied to the reformer 2a of the hydrogen generator 2. Then, the supplied water is heated to be steam, and the material gas and the steam reacts with each other to generate the hydrogen-containing gas. The generated hydrogen-containing gas flows through the shift converter 2c and the purifier, not shown, in the hydrogen generator 2 to generate the hydrogen-containing gas (fuel gas) whose carbon monoxide is reduced. The generated fuel gas flows out from the fuel gas outlet port of the hydrogen generator 2 to the fuel gas passage 23.

The fuel gas generated by the hydrogen generator 2 is supplied through the fuel gas passage 23 to an anode of the fuel cell 1, and the first oxidizing gas (air) is supplied from the air blower 3 through the first oxidizing gas passage 25 to the cathode of the fuel cell 1. Then, hydrogen in the fuel gas and oxygen in the first oxidizing gas react with each other to generate electricity. The surplus fuel gas unconsumed in the fuel cell 1 is supplied as the off gas through the off gas passage 27 to the burner 2b of the hydrogen generator 2, and the off gas is used as the combustion fuel in the burner 2b.

At this time, the gas in the first space 72 is discharged from the exhaust port 42 by the exhaust fan 5 that is one example of the first device of the present invention. Therefore, even if the combustible gas, such as the fuel gas, leaks from the hydrogen generator 2 or the fuel cell 1 in the first space 72, the leaked combustible gas is discharged by the exhaust fan 5 through the exhaust port 42 to the outside of the package 70. Moreover, in a case where the combustible gas, such as the fuel gas, leaks from the hydrogen generator 2 or the fuel cell 1, the combustible gas may flow into the second space 73 through the communicating portion 74 of the dividing wall 71. However, actually, since the pressure in the first space 72 is lower than the pressure in the second space 73 by the operation of the exhaust fan 5, there is a high possibility that the gas in the second space 73 flows into the first space 72 through the communicating portion 74. Therefore, there is a low possibility that the combustible gas leaked in the first space 72 flows into the second space 73 and is ignited by the spark generated by the inverter circuit 11, the power supply circuit 13, or the second connector 12 in the second space.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

Industrial Applicability

In accordance with the power generating system of the present invention, the complexity of the wires connecting respective devices can be reduced while suppressing the possibility of the occurrence of the ignition or the like caused by the spark generated by the control device even if the combustible gas leaks in the package.

The invention claimed is:

1. A power generating system comprising:
    a package;
    a power generator configured to generate a DC power using a combustible gas;
    a combustible gas passage through which the combustible gas flows;
    a first device configured to operate using a DC power of a first voltage;
    a second power supply circuit configured to generate the DC power of the first voltage from an AC power supplied from a system power supply outside the power generating system;
    a first connecting unit disposed between the first device and the second power supply circuit to electrically connect the first device and the second power supply circuit;
    a control circuit configured to control the first device using the DC power of the first voltage; and
    a first power supply circuit configured to generate a power of a second voltage that is higher than the first voltage, wherein
    the package is divided by a dividing wall into a first space in which the power generator, the combustible gas passage, the first device, the first connecting unit, and the control circuit are arranged and a second space in which the first power supply circuit and the second power supply circuit are arranged.

2. The power generating system according to claim 1, further comprising:
    a second device arranged in the package to operate by the power of the second voltage; and
    a second connecting unit arranged between the system power supply and the second device or between the first power supply circuit and the second device to electrically connect the system power supply and the second device or the first power supply circuit and the second device, wherein
    the second connecting unit is arranged in the second space.

3. The power generating system according to claim 1, further comprising:
    a communicating portion formed at a part of the dividing wall and through which the first space and the second space are communicated with each other; and
    a ventilator configured to discharge the gas in the first space to outside.

4. The power generating system according to claim 1, further comprising a hydrogen generator including a reformer configured to generate a hydrogen-containing gas using a material gas by a reforming reaction, wherein
    the power generator is a fuel cell configured to generate electric power using the hydrogen-containing gas supplied from the hydrogen generator, and the hydrogen generator is arranged in the first space.

5. The power generating system according to claim 4, further comprising a first oxidizing gas supplier configured to supply an oxidizing gas to the fuel cell, wherein
    the first device is the first oxidizing gas supplier.

6. The power generating system according to claim 4, further comprising:
    a combustor configured to heat the reformer; and
    a second oxidizing gas supplier configured to supply an oxidizing gas to the combustor, wherein
    the first device is the second oxidizing gas supplier.

7. The power generating system according to claim 2, further comprising a hydrogen generator including a reformer configured to generate a hydrogen-containing gas using a material gas by a reforming reaction, wherein
    the power generator is a fuel cell configured to generate electric power using the hydrogen-containing gas supplied from the hydrogen generator, and the hydrogen generator is arranged in the first space.

8. The power generating system according to claim 7, wherein:
    the hydrogen generator includes a shift converter configured to reduce carbon monoxide in the hydrogen-containing gas supplied from the reformer by a shift reaction; and
    the second device is a heater configured to heat the shift converter.

9. The power generating system according to claim 7, further comprising a combustor configured to heat the reformer, wherein:
the combustor includes an igniter; and
the second device is the igniter.

10. The power generating system according to claim 2, wherein the second connecting unit is configured to have a function of supplying and stopping supplying the electric power to the second device.

11. The power generating system according to claim 10, wherein supply of a voltage from the second connecting unit to the second device stops in a stand-by state.

12. The power generating system according to claim 10, wherein supply of a voltage from the second connecting unit to the second device stops in a case where a malfunction regarding leakage of the combustible gas occurs.

13. The power generating system according to claim 1, wherein the first power supply circuit includes a DC/DC convertor configured to convert the DC power generated by the power generator into a high-voltage DC power and a DC/AC inverter configured to convert the DC power output from the DC/DC convertor into an AC power.

* * * * *